United States Patent
Kamiguchi et al.

(10) Patent No.: US 7,144,531 B2
(45) Date of Patent: Dec. 5, 2006

(54) METHOD OF AND DEVICE FOR EVALUATING RESIN USING INJECTION MOLDING MACHINE

(75) Inventors: Masao Kamiguchi, Yamanashi (JP); Tatsuhiro Uchiyama, Gotenba (JP); Kazuo Kubota, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 106 days.

(21) Appl. No.: 10/091,385

(22) Filed: Mar. 7, 2002

(65) Prior Publication Data

US 2002/0153630 A1    Oct. 24, 2002

(30) Foreign Application Priority Data

Mar. 7, 2001  (JP)  .............. 2001-063529
Jul. 10, 2001  (JP)  .............. 2001-209448

(51) Int. Cl.
  B29C 45/77  (2006.01)
  B29C 45/78  (2006.01)

(52) U.S. Cl. .............. 264/40.1; 425/145; 700/200

(58) Field of Classification Search .............. 264/40.1, 264/40.5, 40.6, 40.3, 328.1; 425/145, 149, 425/542; 700/200, 204; 73/54.11, 54.13
See application file for complete search history.

(56) References Cited

U.S. PATENT DOCUMENTS

| | | | |
|---|---|---|---|
| 4,695,237 A | | 9/1987 | Inaba |
| 4,850,217 A | * | 7/1989 | Nunn .................. 73/54.11 |
| 5,260,008 A | * | 11/1993 | Yokota .................. 264/40.1 |
| 6,019,917 A | * | 2/2000 | Ryckebusch et al. ...... 264/40.1 |

FOREIGN PATENT DOCUMENTS

| | | |
|---|---|---|
| EP | 0372899 A1 | 6/1990 |
| EP | 0436732 A1 | 7/1991 |
| EP | 1044781 A2 | 10/2000 |
| JP | 60-107315 | 6/1985 |
| JP | 60-139422 | 7/1985 |
| JP | 2-201602 | 8/1990 |
| JP | 3-58821 | 3/1991 |
| JP | 10-109339 | 4/1998 |
| JP | 2000-355033 | 12/2000 |

OTHER PUBLICATIONS

Himanshu R. Sheth, et al., "An Adaptive Control Methodology for the Injection Molding Process. Part 1: Material Data Generation", Journal of Injection Molding Technology, Jun. 1998, vol. 2, No. 2, pp. 86-94.
A. Haddout, et al., "Un Nouveau Rheometre Instrumente Sur Press", Revue Generale Des Caoutchoucs et Plastiques, Societe D'Expansion Technique et Economique, Paris, France, vol. 71, Nr. 729, pp. 40-42.
C. Bader, et al., "Rheologische Messungen auf der SpritzgieBmaschine", Carl Hanser Verlag, Munchen 1991, pp. 220-224.
Japanese Examiner Grounds for Prior Art Rejection for Corresponding Japanese Application 2001-209448 and English Translation of Same.

* cited by examiner

Primary Examiner—Jill L. Heitbrink
(74) Attorney, Agent, or Firm—Staas & Halsey LLP

(57) ABSTRACT

A method of and an apparatus for measuring and evaluating characteristics of material resin using an injection molding machine. Injections of resin are performed with different resin temperatures TCi and different injection velocities Vj to detect injection pressures Pr at set screw positions. Data of combinations (Pr, V, TC) of an N number of injection pressures, injection velocities and resin temperatures are obtained. An interdependency relation function $P_{VT}(t, v(x), x)$ expressing correlation among the injection pressure, the injection velocity and the resin temperature is obtained as $P_{VT}(t, v(x), x) = A(x)e^{-\alpha(x)T}v(x)^{\beta(x)}$ according to a least square method using the obtained data, where $\beta(x)$ represents a degree of dependency on injection velocity influencing the injection pressure and "$\log A(x) - \alpha(x)T$" represents a degree of dependency on resin temperature influencing the injection pressure.

36 Claims, 12 Drawing Sheets

FIG.12

| N | TEMPERATURE | VELOCITY | TIME m | PRESSURE | POSITION |
|---|---|---|---|---|---|
| 0 | TC0 | V0 | 0<br>1<br>⋮<br>M | Pr(0)<br>Pr(1)<br>⋮<br>Pr(M) | SP(0)<br>SP(1)<br>⋮<br>SP(M) |
| 1 | TC0 | V1 | 0<br>⋮<br>M | Pr(0)<br>⋮<br>Pr(M) | SP(0)<br>⋮<br>SP(M) |
| ⋮ | ⋮ | ⋮ | ⋮ | ⋮ | ⋮ |
| J-1 | TC0 | V(J-1) | 0<br>⋮<br>M | Pr(0)<br>⋮<br>Pr(M) | SP(0)<br>⋮<br>SP(M) |
| J | TC1 | V0 | 0<br>⋮<br>M | Pr(0)<br>⋮<br>Pr(M) | SP(0)<br>⋮<br>SP(M) |
| ⋮ | ⋮ | ⋮ | ⋮ | ⋮ | ⋮ |
| 2J-1 | TC1 | V(J-1) | 0<br>⋮<br>M | Pr(0)<br>⋮<br>Pr(M) | SP(0)<br>⋮<br>SP(M) |
| ⋮ | ⋮ | ⋮ | ⋮ | ⋮ | ⋮ |
| (I-1)J | TCI-1 | V0 | 0<br>⋮<br>M | Pr(0)<br>⋮<br>Pr(M) | SP(0)<br>⋮<br>SP(M) |
| ⋮ | ⋮ | ⋮ | ⋮ | ⋮ | ⋮ |
| IJ-1 | TCI-1 | V(J-1) | 0<br>⋮<br>M | Pr(0)<br>⋮<br>Pr(M) | SP(0)<br>⋮<br>SP(M) |

Tb-1 brackets the PRESSURE and POSITION columns.

FIG.13

| N | TEMPERATURE | VELOCITY | PRESSURE |
|---|---|---|---|
| 0 | TC0 | V0 | Pr0 |
| 1 | TC0 | V1 | Pr1 |
| ⋮ | ⋮ | ⋮ | ⋮ |
| J−1 | TC0 | V(J−1) | Pr(J−1) |
| J | TC1 | V0 | Pr0 |
| ⋮ | ⋮ | ⋮ | ⋮ |
| 2J−1 | TC1 | V(J−1) | Pr(J−1) |
| ⋮ | ⋮ | ⋮ | ⋮ |
| (I−1)J | TCI | V0 | Pr(0) |
| ⋮ | ⋮ | ⋮ | ⋮ |
| IJ−1 | TCI | V(J−1) | Pr(J−1) |

Tb−2

DRYING TIME OF RESIN (HOUR)

METHOD OF AND DEVICE FOR EVALUATING RESIN USING INJECTION MOLDING MACHINE

BACKGROUND OF THE INVENTION

1. Field of the Invention

The present invention relates to a method of and an apparatus for detecting, analyzing and evaluating characteristics of resin as molding material using an injection molding machine.

2. Description of the Related Art

It is necessary to set a large variety of molding conditions for performing an injection molding operation using an injection molding machine. It takes a long time and requires sufficient experiences to obtaining non-defective product by setting optimum values for the molding conditions. Even if a kind of the resin for use in the injection molding operation is the same, characteristics of the resin have deviation in different lots and defective molding may occur because of the deviation).

It has been developed a pressure curve following control for controlling the injection pressure based on a velocity of the servomotor in learning a gain of the control system so that the injection pressure follows the pressure curve obtained injection producing a non-defective article. In this control, non-uniformity of melting characteristics of the resin in the same lot are absorbed to ensure stability of the molding operation. However, in the case where the temperature of the resin varies greatly, there is a possibility of causing a defective molding by an excessive correction of the injection velocity and therefore it is necessary to set a limit on the correction. It is assumed that this caused by a fact that the control is performed considering only a velocity dependency factor of the resin pressure characteristics which includes the velocity dependency factor and the temperature dependency factor. In order to expand an applicability of this control, it is necessary to clarify the resin pressure characteristics with respect to the velocity dependency factor and the temperature dependency factor and to take the temperature dependence factor into consideration.

As a conventional method of obtaining flux characteristics of the resin, there is known a method of measuring the resin characteristics, such as viscosity of resin, with respect to shearing velocity using a special resin characteristic measuring device.

In the case of determining a difference of the characteristics of resin using an injection molding machines without the special measuring machine, there is known only a method of determining the resin characteristics by comparing the reference pressure curve and the actual pressure curve.

However, in the method of determining a difference in the resin characteristics of different lots by comparing the pressure curves, there is a problem of only a relative difference of resin characteristics in the resin of different lots is obtained and absolute characteristics of resin can not obtained. In the method of measuring the resin characteristics using the special resin characteristics measuring device, since it is difficult to produce the condition same as that in the actual molding operation, i.e., the condition that the molten resin of high temperature and high injection velocity, it is hardly possible to obtain practical results of measurement.

SUMMARY OF THE INVENTION

An object of the present invention is to provide a method of and a device for analyzing characteristics of resin using an injection molding machine.

According to a first aspect of the present invention, a resin evaluation method for an injection molding machine comprises the steps of: setting analysis conditions including an injection velocity condition and a resin temperature condition; performing injections of resin using the injection molding machine under the set analysis conditions; and obtaining a degree of resin-temperature dependency of a resin pressure and/or a degree of velocity or flow-rate dependency of a resin pressure based on a relationship between the resin pressure and a screw position or a relationship between the resin pressure and an elapsing time from a start of injection obtained in said injections of resin.

According to a second aspect of the present invention, an interdependency relation of the resin pressure with respect to the resin temperature and an injection velocity or a flow rate of resin is obtained based on a relationship between the resin pressure and a screw position or a relationship between the resin pressure and an elapsing time from a start of injection in the injections of resin.

According to a third aspect of the present invention, a resin evaluation method for an injection molding machine comprises the steps of: performing a predetermined times of injections on condition of a resin temperature automatically altered successively, and an injection velocity automatically altered successively on each condition of the resin temperature; detecting an injection pressure in each of the injections, obtaining data of the injection pressure, the injection velocity and the resin temperature in each of the injections; and automatically obtaining an interdependency relation of the resin pressure with respect to the resin temperature and the injection velocity or flow rate of resin based on combinations of the data of the injection pressure, the injection velocity and the resin temperature in the injections.

The screw position and the injection pressure may be detected at every predetermined period in each of injections, and the interdependency relation is automatically obtained as a function of the screw position or an elapsing time from a start of injection.

The injection pressure may be detected at predetermined positions or predetermined points in time elapsing from a start of injection in each of the injections, and the data of the injection pressure, the injection velocity and the resin temperature are obtained in each of the injection.

The injection of resin may comprise an air shot of injecting resin in air without a mold attached to the injection molding machine.

The interdependency relation may be obtained according to an equation expressing the resin pressure using a power function of the injection velocity of the flow rate of resin, and an exponential function of the resin temperature. The degree of resin temperature dependency of the resin pressure and the degree of velocity or flow rate dependency of the resin pressure may be obtained based on the obtained equation.

The resin pressure may be detected by a pressure sensor for detecting resin pressure at a nozzle of the injection molding machine or a pressure sensor for detecting resin pressure applied to the screw.

The relationship between the resin pressure and the screw position or the relationship between the resin pressure and the elapsing time from a start of injection are expressed by the resin pressure at set screw positions or the resin pressure at set points in time elapsing from a start of each injection.

The resin temperature condition may be represented by a nozzle temperature or a cylinder temperature.

Further, the present invention provide a resin evaluation device using an injection molding machine for carry out the above method of evaluating resin.

BRIEF DESCRIPTION OF THE DRAWINGS

FIG. 12 is a diagram showing a data table for storing the collected data in the first embodiment;

FIG. 13 is a diagram showing a data table for storing the collected data in the second and third embodiments;

DETAILED DESCRIPTION OF THE PREFERRED EMBODIMENTS

Figure 1:
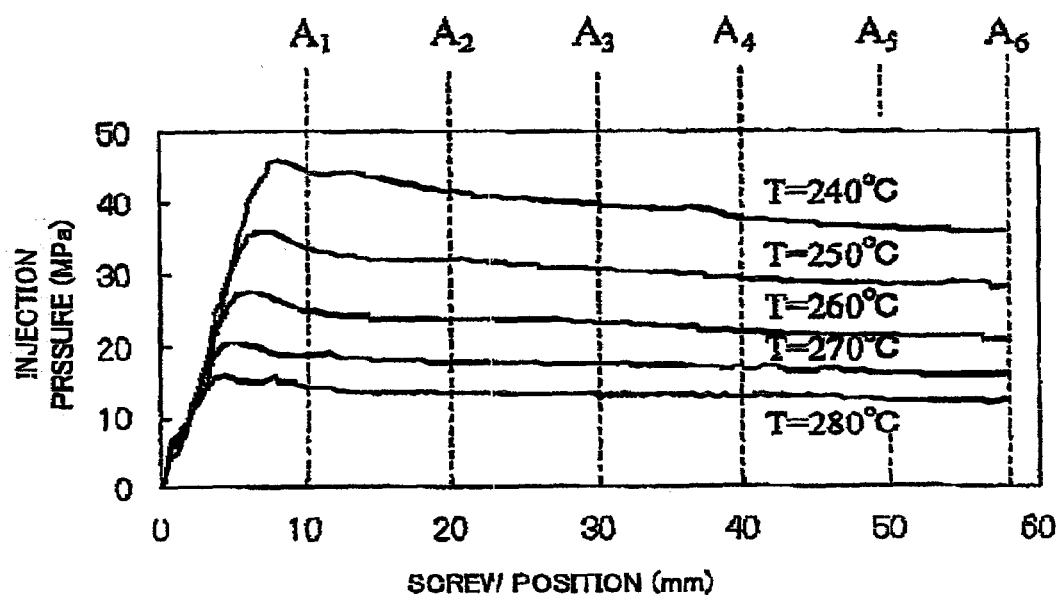
FIG. 1 is a graph showing a result of measurement of an injection pressure at respective screw positions on conditions of different resin temperatures and a constant injection velocity.

An injection pressure P is measured in performing "air shots" of injecting resin with a nozzle opened, i.e., without a mold attached to the nozzle at predetermined screw positions using material resin of PAMA by an electric injection molding machine which performs an injection of resin by a screw axially driven by a servomotor. A result of measurement of the injection pressure P with variation of the screw position in the air shots with a constant injection velocity v under different resin temperatures is shown in FIG. 1. In this example, injections are performed with the injection velocity v of 60 mm/s and different resin temperatures T of 240° C., 250° C., 260° C., 270° C. and 280° C.

Figure 2:
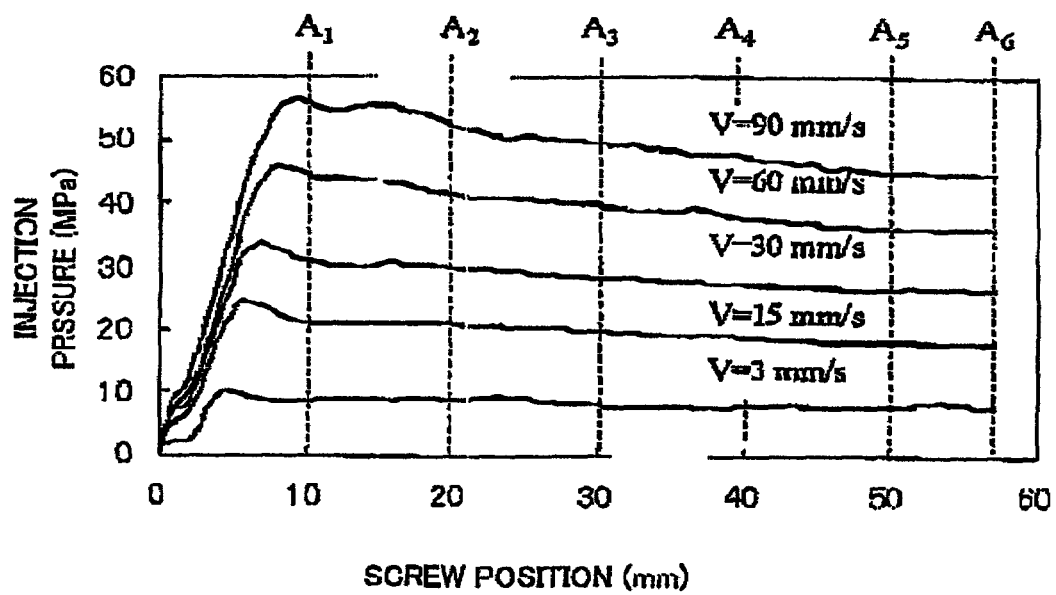
FIG. 2 is a graph showing a result of measurement of an injection pressure at respective screw positions on conditions of different injection velocities and a constant resin temperature.

Further, the injection pressure P is measured with different injection velocities v of 3 mm/s, 15 mm/s, 30 mm/s, 60 mm/s and 90 mm/s and the result of the measurement is shown in FIG. 2. Further, the similar experiments are performed with respect to other kind of resins and the similar results of characteristic curves as shown in FIGS. 1 and 2 were obtained.

Figure 3:
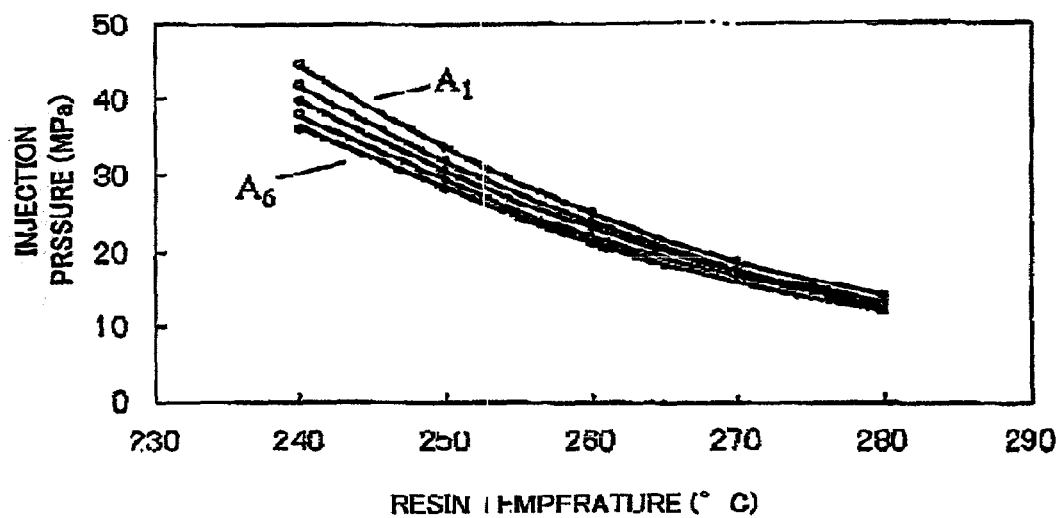
FIG. 3 is a graph showing a relationship of the injection pressure and the resin temperature at i respective screw positions based on the relationship as shown in FIG. 1.

A relationship between the injection pressure P and the resin temperature T at screw positions A 1=10 mm, A2=20 mm, A3=30 mm, A4=40 mm, A5-50 mm and A6-57.5 mm is obtained from the data shown in FIG. 1 and shown in FIG. 3. As seen from FIG. 3, the injection pressure P is damped with increase of the resin temperature T according to an exponential function of the screw position x. It is presumed that the variation of the injection pressure (T, x) with respect to the resin pressure T and the screw position x is expressed by the following equation (1).

$$P(T,x)=c(x)e^{-\alpha(x)T} \tag{1}$$

In the equation (1), $c(x)$ represents a proportional coefficient and $\alpha(x)$ represents temperature coefficient.

Figure 4:
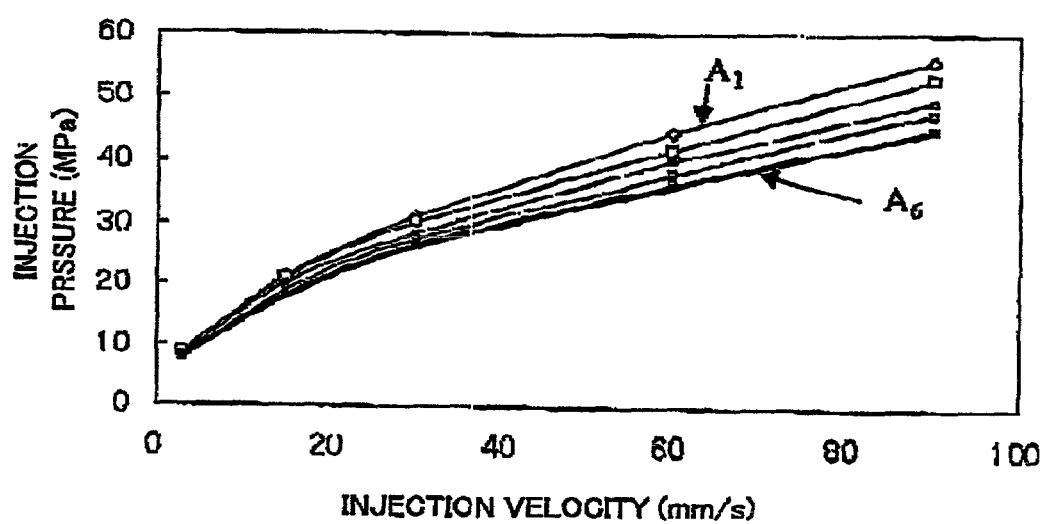
FIG. 4 is a graph showing a relationship of the injection pressure and the injection velocity at respective screw positions based on the relationship as shown in FIG. 2.

A relationship between the injection pressure P and the injection velocity v at screw positions A1–A5 is obtained from FIG. 2 and shown in FIG. 4. As seen from FIG. 4, the injection pressure P increases with increase of the injection velocity v according to a power function of the screw position x. It is presumed that the variation of the injection velocity $P(v(x), x)$ with respect to the injection velocity $v(x)$ and the screw position x is expressed by the following equation (2).

$$P(v(x), x)=d(x)v(x)^{\beta(x)} \tag{2}$$

This equation is expressed by the following equation (3) using logarithm.

$$\log P(T, x)=\log c(x)-\alpha(x)T \tag{3}$$

Figure 5:
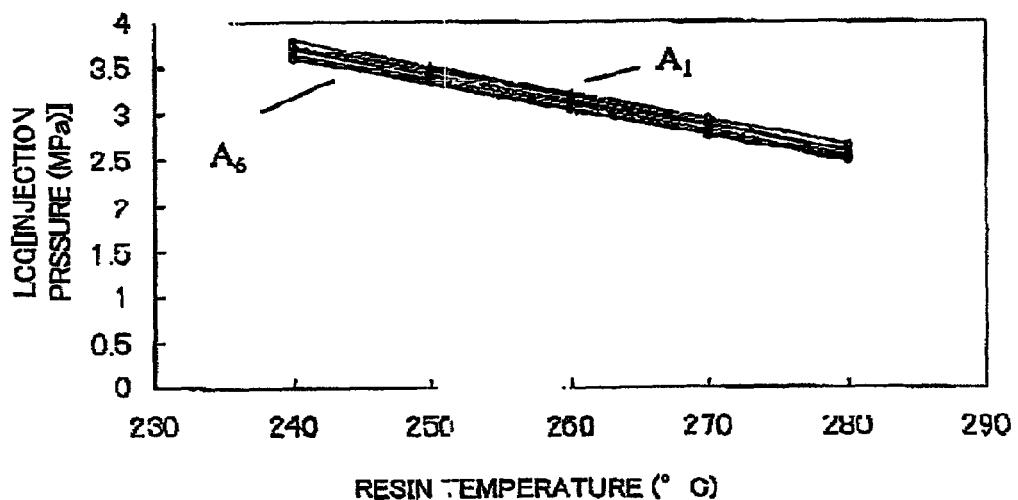
FIG. 5 is a graph showing the relationship as shown in FIG. 3 with an axis of ordinate representing logarithm of the injection pressure.

FIG. 5 shows the relationship with vertical axis (representing the injection pressure P) in FIG. 3 using logarithm as in the equation (3). Each of the resin temperature T shows high linearity.

Similarly, the equation (2) is expressed in the following equation (4) using logarithm.

$$\log P(v(x), x)=\log(x)+\beta(x)\log v(x) \tag{4}$$

Figure 6:
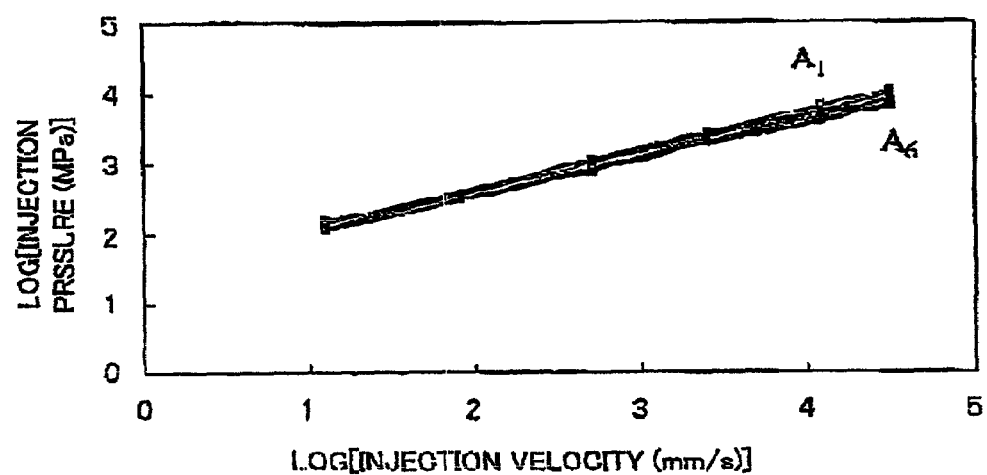
FIG. 6 is a graph showing the relationship a shown in FIG. 4 with an axis of ordinate representing logarithm of the injection pressure.

FIG. 6 shows the above relation with the axis of ordinate (representing injection pressure P) using logarithm, and each of the relations shows high linearity.

Figure 7:
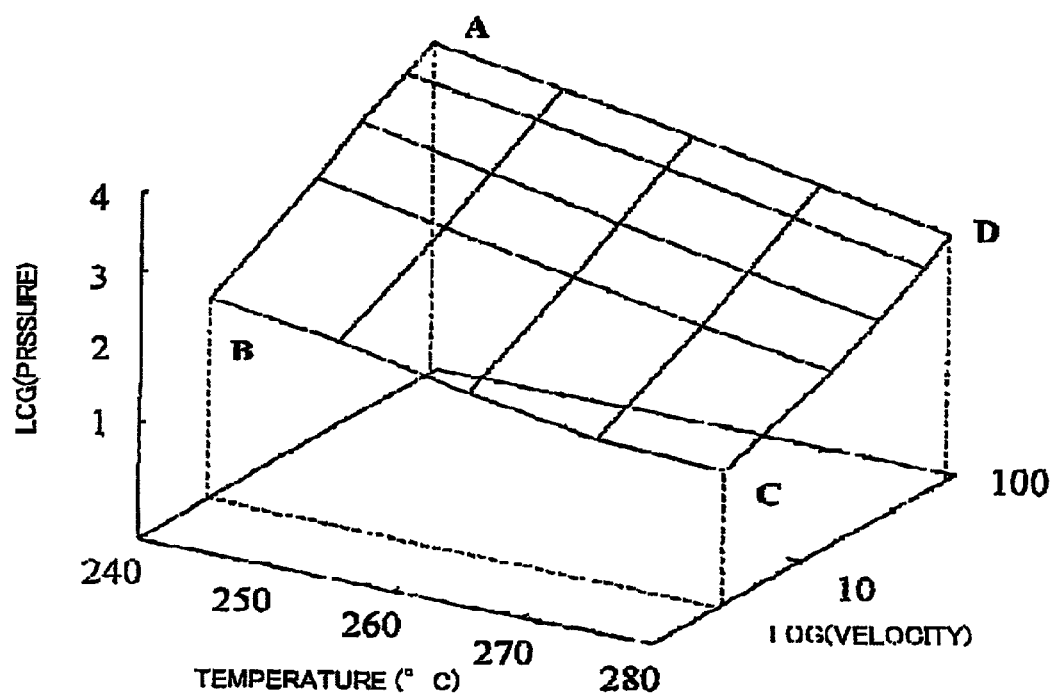
FIG. 7 is a diagram showing a correlation among the injection pressure, the resin temperature and the injection velocity in three-dimensional expression for visual judgment.

FIG. 7 shows the relationship among the injection pressure P, the resin temperature T and the injection velocity v by combining the relationship shown in FIG. 5 and FIG. 6 for three-dimensional visual judgment. As shown in FIG. 7, the relationship among the injection pressure P, the resin temperature T and the injection velocity v is represented by substantially one plane although it is slightly deformed in the vicinity of temperature of 270° C. and the injection velocity of 3 mm/s. Thus, the resin temperature T and the injection velocity v are expressed independently, and the relation on the plane can be expressed by the following equation (5) as a combination of the equation (3) and the equation (4).

$$\log P(T, x) + \log P(v(x), x) = \log [P(T, x) \times P(v(x), x)] \quad (5)$$

Accordingly, the following equation (6) is obtained.

$$P_{vT}(T, v(x), x) = P(T, x) \times P(v(x), x) \quad (6)$$

where $P_{VT}$ represents the injection pressure correlated with the injection velocity V and the resin temperature T.

A function representing the interdependency of the injection pressure with respect to the injection velocity and the resin temperature at an arbitrary screw position can be expressed by the following equation (7).

$$P_{VT}(T, v(x), x) = c(x)e^{-\alpha(x)T} \times d(x)v(x)^{\beta(x)} \quad (7)$$
$$= A(x)e^{-\alpha(x)T}V(X)^{\beta(x)}$$

In order to effect the temperature and the injection velocity independently, the following equation (8) is obtained by taking logarithm of both sides of the equation (7) to make them linear.

$$\log P_{VT}(T, v(x), x) = \log A(x) - \alpha(x)T + \beta(x)\log v(x) \quad (8)$$

In the above equation (8); $\beta(x)$ represents a degree of dependency an the injection velocity influencing the injection pressure (resin pressure) and "$\log A(x) - \alpha(x)T$" represents a degree of dependency of the injection pressure on the resin temperature.

Using the following symbols, $\pi = \log P_{VT}(T,v(x),x)$ $\sigma - \log A(x)$ $\omega = \log v(x)$ the above equation (8) is expressed as the following equation (9).

$$\pi = \sigma - \alpha(x)T + \beta(x)\omega \quad (9)$$

In the equation (8), the injection pressure (resin pressure) P ($=P_{VT}$) is assumed as values of pressure detected by a pressure sensor provided at a distal end of a nozzle for detecting a resin pressure at the distal end of the nozzle, or a pressure sensor provided at an injection screw for detecting a pressure applied from the resin to the injection screw, the injection velocity v is assumed as a set value or a measured value of the actual injection velocity, the resin temperature T is assumed as a set value of a nozzle temperature or a cylinder temperature or a measured value of the nozzle temperature or the cylinder temperature measured by a temperature sensor. The injection pressure P, the injection velocity v and the resin temperature T are obtained in every injection with the nozzle open by varying the temperature T and the injection velocity v as analysis conditions. A set of parameters ($\pi,\omega$, T) for a set of values (P, v, T) is obtained and values of the parameters $\sigma$, $\alpha(x)$, $\beta(x)$ are obtained according to the method of linear least squares as shown by the following equation (10) using the sets of parameters ($\pi,\omega$, T).

$$\sum_i (\pi i - \sigma \beta(x)\omega i + \alpha(x)Ti)^2 = \text{minimum value} \quad (10)$$

In the equation (10), i represents the number of sets of the obtained data. N times of Injections are performed with different injection velocity and different resin temperature to obtain N sets of measured values (Pi, vi, Ti) (i=1 to N) to obtain sets of data ($\pi i$, $\omega i$, Ti).

According to method of least squares, $$\sum_i \pi i - N\sigma - \beta(x)\sum_i \omega i + \alpha(x)\sum_i Ti = 0 \quad (11)$$

$$\sum_i \omega i \pi i - \sigma\sum_i \omega i - \beta(x)\sum_i \omega i^2 + \alpha(x)\sum_i Ti = 0 \quad (12)$$

$$\sum_i Ti\pi i - \sigma\sum_i Ti - \beta(x)\sum_i Ti\omega i + \alpha(x)\sum_i Ti^2 = 0 \quad (13)$$

$\sigma (=\log A(x))$, $\alpha(x)$, $\beta(x)$ are obtained by solving simultaneous equations (11), (12) and (13). Thus, the velocity dependency degree $\beta(x)$, resin temperature dependency degree ($\log A(x) - \alpha(x)T$) of the injection pressure (resin pressure) are obtained to evaluate characteristics of resin.

The above equation (7) expressing the interdependency relation is applied to the case where a flow rate can be expressed by the injection velocity using a cross-sectional area of the cylinder and an interdependency relation of the injection pressure (resin pressure) with respect to a flow rate Q of resin and the resin temperature T is expressed by the following equation (14). The flow rate Q is equal to a product of the injection velocity and the cross-sectional area of the cylinder.

$$P_{QT}(T, Q(x), x) = B(x)Q(x)^{\gamma(x)}e^{-\alpha(x)T} \quad (14)$$

where $P_{QT}$ represents the injection pressure correlating to the resin flow rate Q and the resin temperature T.

The following equation (15) is obtained by taking logarithm of both sides of the equation (14).

$$\log P_{QT}(T, Q(x), x) = \log B(x) + \gamma(x)\log Q(x) - \alpha(x)T \quad (15)$$

In the above equation (15), "$\gamma(x)$" represents a degree of dependency on the flow rate influencing the injection pressure (resin pressure) and "$\log B(x) - \alpha(x)T$" represents a degree of dependency of the injection pressure on the resin temperature.

Using the following symbols, $\pi = \log P_{QT}(T,Q(x),x)$ $\sigma = \log B(x)$ $\omega = \log Q(x)$ the above equation (15) is expressed as the following equation (16).

$$\pi = \sigma - \gamma(x)\omega - \alpha(x)T \quad (16)$$

The injection pressure (resin pressure) P, the injection velocity v and the resin temperature T are obtained in each of N injections (i=1 to N) with the nozzle opened under the different temperature T and the different injection velocity v as analysis conditions. The flow rate Q is obtained by multiplying the injection velocity v by the sectional area of the cylinder. N sets of injection data ($\pi i$, $\omega i$, Ti) for N sets of values (Pi, Qi Ti) (i=1 to N) is obtained and values of the parameters σ, γ(x), β(x) are obtained according to the method of linear least squares using the N sets of injection data (πi, ωi, Ti).

$$\sum_i (\pi i - \sigma - \gamma(x)\omega i + \alpha(x)Ti)^2 = \text{minimum value} \quad (17)$$

According to method of least squares, $$\sum_i \pi i - N\sigma - \gamma(x)\sum_i \omega i + \alpha(x)\sum_i Ti = 0 \quad (18)$$

$$\sum_i \omega i\pi i - \sigma\sum_i \omega i - \gamma(x)\sum_i \omega i^2 + \alpha(x)\sum_i Ti = 0 \quad (19)$$

$$\sum_i Ti\pi i - \sigma\sum_i Ti - \gamma(x)\sum_i Ti\omega i + \alpha(x)\sum_i Ti^2 = 0 \quad (20)$$

σ(=log A(x)), α(x), γ(x) are obtained by solving simultaneous equations (18), (19) and (20). Thus, the flow rate dependency degree γ(x), resin temperature dependency degree (log A(x)–α(x)T) of the injection pressure (resin pressure) are obtained to evaluate characteristics of resin.

Figure 8:
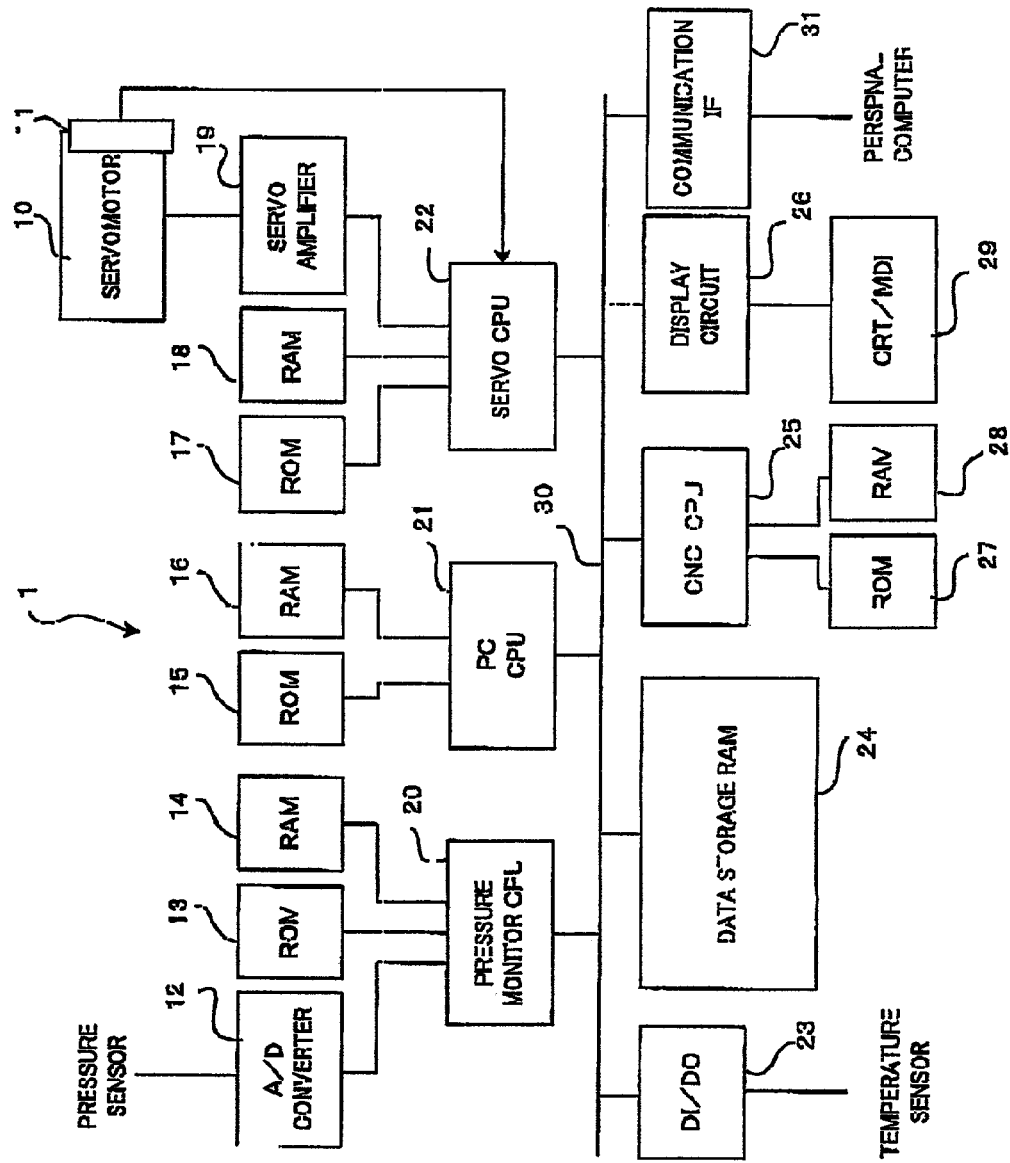
FIG. 8 is a block diagram of a controller of an injection molding machine for constituting, a resin evaluating device for carrying out the resin evaluating method of the present invention.

A controller of an injection molding machine for constituting a part of or an entire arrangement of a resin evaluating device for carrying out the resin evaluating method of the present invention will be described referring to FIG. 8.

The controller 1 comprises a CNC CPU 25 as a microprocessor for numerical control, a PC CPU 21 as a microprocessor for programmable controller, a servo CPU 22 as a microprocessor for servo control and a pressure monitor CPU 20 for performing sampling of signals from pressure sensors provided at the injection molding machine for detecting various pressure including an injection pressure through an A/D converter 12 and for storing the sampled values in a RAM 14. In particular, signals from a pressure sensor such as a load cell provided at an injection screw for detecting the injection pressure applied from molten resin to the injection screw arm sampled and stored in the RAM 14 and also in a data table Tb-1 as injection pressure data for evaluating characteristics of resin, as described later. Information is transmitted among the microprocessors by selecting mutual inputs/outputs through a bus 30.

The PC CPU 21 is connected with a ROM 15 storing a sequence program for controlling a sequential operation of the injection molding machine and a RAM 16 for temporary storage of arithmetic operation data. The CNC CPU 25 is connected with a ROM 27 storing an automatic operation program for generally controlling the injection molding machine and a RAM for temporary storage of arithmetic operation data The servo CPU 22 is connected with a ROM 17 storing a control program dedicated for a servo control of processing of a position loop, a velocity loop and a current loop, and a RAM 18 for temporary storage of arithmetic operation data. The pressure monitor CPU 20 is connected with a ROM 13 storing a control program for pressure monitor and a RAM 14 for storing sampled data of pressure detected by the various sensors.

The servo CPU 22 is further connected with a servo amplifier 19 for driving servo motors 10 for respective axes of mold clamping, injection, screw rotation, ejector and outputs of position/velocity detectors 11 are fed back to the servo CPU 22. Present positions of respective axes are calculated by the servo CPU 22 based on the position feedback signals from the position/velocity detectors 11 and stored to be updated in registers for storing present positions of respective axes. In FIG. 8, there are shown the servomotor 10 for driving injection axis (for axial motion of the screw) and the position/velocity detector 11 provided at the servomotor for detecting a position and a velocity of the injection screw, and the other servomotors and position/velocity detectors are provided in the similar manner.

An interface 23 is provided for receiving signals from limit switches arranged at respective portions of the injection molding machine and an operation panel, and for transmitting various commands to peripheral equipments of the injection molding machine. In particular, the interface receives signals representing detected temperature from a temperature sensor provided at a cylinder and a nozzle of the injection molding machine.

A manual data input device 29 with a display is connected to the bus 30 through a display circuit 26 and capable of displaying graphs and selecting function menu and inputting various data through numeral keys and function keys. The display device may be a CRT or a LCD (liquid crystal display). A communication interface 31 is connected to the bus 30 and a personal computer may be connected to the controller 1 through the communication interface 31.

A molding data storage RAM 24 formed by nonvolatile memory is provide for storing various molding conditions and set values concerning the injection molding operations, parameters and macro variables. A data table Tb-1 and a data table Tb-2 are provided in the data storage RAM 24 for storing the injection pressure, the screw position, the injection velocity and the resin temperature (nozzle temperature or cylinder temperature) as the measurement data for evaluating characteristics of resin, as described later.

With the above arrangement, the PC CPU 21 controls a sequential operation of the injection molding machine, the CNC CPU 25 distributes motion commands for the servomotors of respective axes based on the operation program stored in the ROM 27 and the molding conditions stored in the data storage RAM 24, and the servo CPU 22 performs digital servo processing of the position loop, like velocity loop and the current loop in a conventional manner based on the illustrated motion commands and feedback signals of position and velocity from the position/velocity detectors 11.

The resin evaluating device may comprise the above-described controller of the injection molding machine, or such controller and the personal computer connected thereto.

A first embodiment of the present invention in which the resin characteristics are evaluated using the controller 1 of the injection molding machine and the personal computer will be described.

Figure 9:
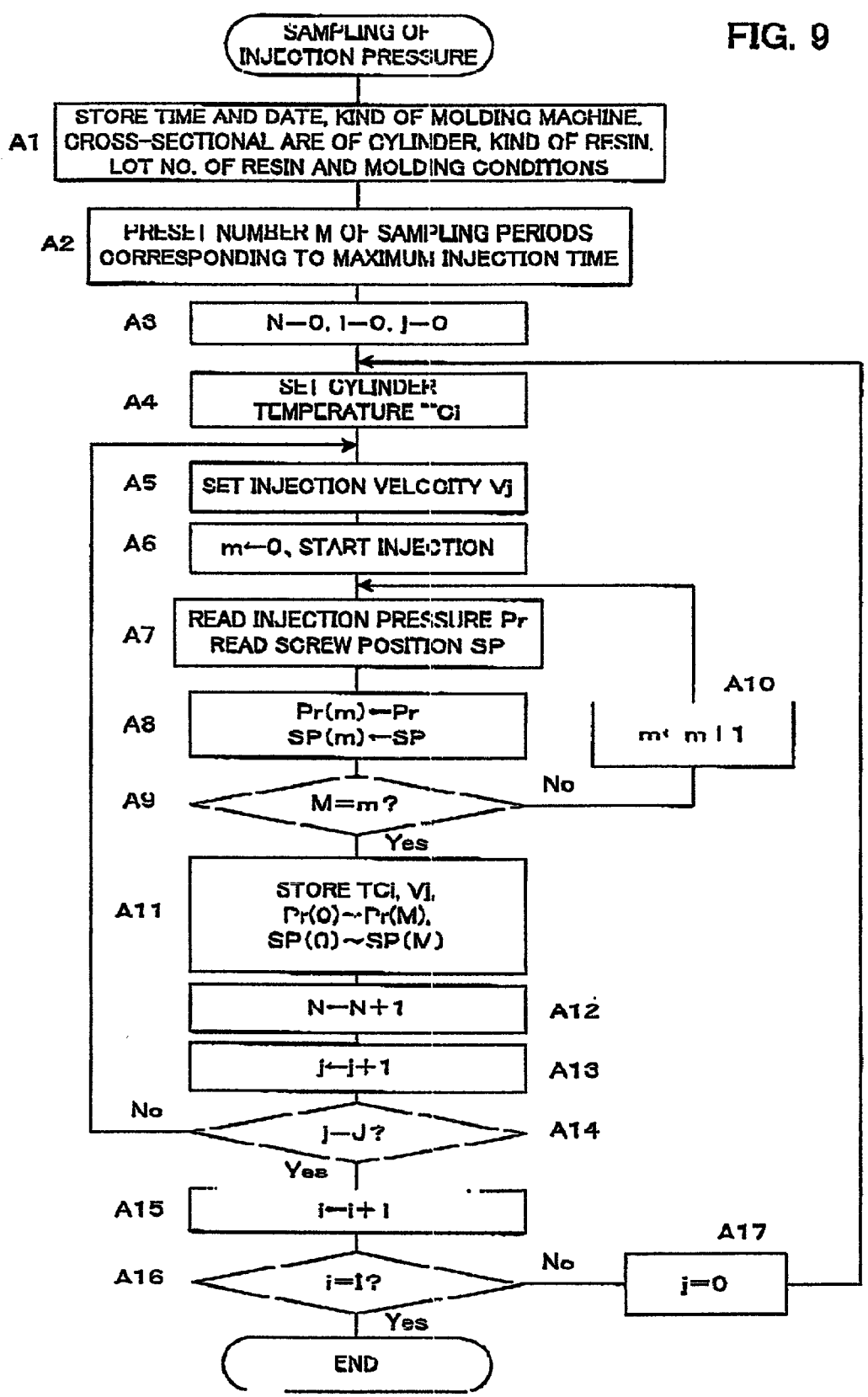
FIG. 9 is a flowchart of data collection processing for the evaluation of resin according to a first embodiment of the present invention.

FIG. 9 shows a flowchart of processing to be performed by the PC CPU 21 of the controller 1 for obtaining data for evaluating characteristics of resin. This processing may be performed by another processor in the controller, such as the pressure monitor CPU 20 and the CNC CPU 25 having capability margin of processing, other than the PC CPU 21.

First, time and date of performing the resin evaluation, kind of injection molding machine, a cress-sectional area of the cylinder, kind of resin, a lot number of resin, molding condition: (as the analysis condition), and further values of cylinder temperature (and/or nozzle temperature) for evaluating the resin under variety of resin temperature as one of the analysis condition are set. In this embodiment, "I" number of resin temperatures TCi (i=0 to I–1) are set. Also, "I" number of injection velocities Vj (j=0 to J–1) are set for varying the injection velocity as one of the analysis conditions.

When a command for evaluating the resin from the MDI 29 in a state where the nozzle of the injection molding machine is opened, the pressure monitor CPU 20 reads the time and date of the resin evaluation, the kind of injection molding machine, the kind of resin, the cross-sectional area of the cylinder, the lot number of the resin and the molding conditions, and stores them in the data storage RAM 24 as the resin evaluation data (Step A1). Then, the processor sets the number M of sampling periods corresponding to a set maximum injection time period (Step A2). Indexes N, i and j are set to "0" (Step A3) and a value of the resin temperature TCi indicated by the index "i" is read and set as the set temperature of the cylinder (and/or the nozzle,) (Step A4). Then, a value of the injection velocity Vj indicated by the index j is read and set as the injection velocity as the injection condition when the detected value of the temperature sensor provided at the cylinder (and/or the nozzle) reaches the set resin temperature (Step A5). A counter m for counting the number of sampling times is set to "0" and the injection is started (Step A6).

The resin pressure (resin pressure) Pr defected by the pressure detector, such as a load cell, provided at the screw and for detecting the resin pressure applied to the screw from the resin is read by the pressure monitor CPU 20 through the A/D converter 12. The present position SP of the screw is obtained by the servo CPU based on the feedback signals from the position/velocity detector 11 and stored in the present position register. The injection pressure (resin pressure) Pr and the present position SP of the screw are read and stored in a register as Pr(m) and SP(m), respectively, with the index value of "m" (Step A8). It is determined whether or not the value of the counter in reaches the set value M. (Step A9). If the value of the counter m does not reach the set value M, the counter m is incrementally increased by "1" (Step A10) and the procedure returns to Step A7. Subsequently, the processing of Steps A7–A10 are executed repeatedly at every sampling period to store the injection pressure (resin pressure) Pr and the screw position SP.

When the value of the counter m reaches the set number M of the sampling periods which corresponds to the maximum injection time period, the present value of the index N, the present set values of the resin temperature TCi and the injection velocity Vj, the value of the counter m, the injection pressures (resin pressures PI(0)–Pr(M), the screw positions SP(0)–SP(M) are stored in the table Tb-1 provided in the data storage RAM 24, as shown in FIG. 12 (Step A11).

Then, the indexes N and j are increased by "1", (Steps A12, A13) and it is determined whether or not the index j reaches the set value J of the injection velocity (Step A 14) and if the index j does not reach the set value J, the procedure returns to Step A5 where a value of the injection velocity Vj indicated by the index j is set and the processing of Step A6 and the subsequent Steps is performed.

Then, the processing of Steps A5–A14 is repeatedly executed until the index j reaches the set value J so as to fill the data table Tb-1 as shown in FIG. 12.

When the index j reaches the index J, the index i is incrementally increased by "1" (Step A15) and it is determined whether or not the index i reaches the set value I (Step A16). If the index i does not reach the set value I, the index j is set to "0" (Step A17) and the procedure returns to Step A4 where the resin temperature (cylinder temperature) is set to the next value of TCi and the processing of Step A5 and the subsequent Steps is started when it is determined that the resin temperature reaches the new set temperature.

Subsequently, the processing of Steps A4–A17 is repeatedly executed until the index i reaches the set value I so as to fill the data table Tb-1.

Thus, the resin temperature TCi, the injection velocity Vj, the value of the counter m for counting the number of sampling times, the screw positions SP(0)–SP(M) are stored for every index N. The injection velocity varying from V(0) to V(J–1) and the value of the counter m representing the time period from a start of injection from 0 to M, the injection pressure varying from Pr(0) to Pr(M) and the screw position varying from SP(0) to SP(M) for each of combinations of one resin temperature TCi and the J number of injection velocities Vj. As a result, the (I×J) number of combinations of the data indicated by the index N varying from "0" to (IJ–1) are stored in the table Tb-1.

When the data collection processing is completed, the data stored in the data table Tb-1, the preset data of the time and date of resin evaluation, the kind of injection molding machine, the cross-sectional area of the cylinder, the kind of resin, the lot number of resin, the molding conditions are sent to the personal computer through the communication interface 31.

In the personal computer, i is selected that the resin evaluation is to be performed using the injection velocity or the flow rate of resin and one of the screw position and the point in time is selected for indicating the injection pressure, (resin pressure). The selection of the injection pressure (resin pressure) is to set by an appropriate screw position or a point in time which is suitable for evaluating the resin characteristics, for example, by setting a screw position or a point in time at which the injection is completed and a pressure holding process is to be started.

In the case where the screw position is selected as the factor of selecting the injection pressures (resin pressures) and the appropriate value of the screw position is set, the position SP equivalent or closest to the set value of the screw position is selected from the data table Tb-1 and the injection pressures (resin pressures) corresponding to the set screw position are determined. Alternatively, the values of the injection pressure (resin pressure) Pr may be determined by interpolation to correspond to the set screw position. Then, the N number of combinations (Pr, V, TC) (=(P, v, T)) of the N number of values of the injection pressure (resin pressure), values of the injection velocity and values of the resin temperature are determined.

In the case where the time is selected as the factor of determining values of the injection pressure (resin pressure) and all appropriate point in time is set, values of the injection pressure (resin pressure) Pr(m) indicated by the counter in which corresponds to the set point in time are read and the N number of combinations (Pr, V, TC) of the N number of values of the injection pressure (resin pressure), values of the injection velocity and values of the resin temperature are determined.

Further, when the injection velocity is adopted as the analysis condition for analyzing the resin, the ternary simultaneous equations (11)–(13) are solved based on the combinations (Pr, V, TC) of the N number of values of the injection pressure (resin pressure), the values of the injection velocity and the values of the resin temperature, to obtain $\sigma(=\log A(x))$, $\alpha(x)$ and $\beta(x)$ Thus, the resin characteristics are evaluated based on the velocity dependence degree $\beta(x)$ and the resin temperature dependence degree "log $A(x)-\alpha(x)T$". The interdependence coefficient among the resin temperature, the injection velocity and the injection pressure (resin pressure) is obtained according to the equation (7).

In the case where the flow rate of resin is adopted as the analysis condition for analyzing the resin, a value of the flow rate Q is obtained by multiplying the injection velocity by the cross-sectional area of the cylinder to obtain the combinations (Pr, Q, TC) of the N number of values of the injection pressure (resin pressure), values of the flow rate and values of the resin temperature. Then, the ternary simultaneous equations (18)–(20) are solved to obtain $\sigma(-\log B(x))$, $\alpha(x)$, $\gamma(x)$. Thus, the resin characteristics are evaluated based on the flow rate dependency degree $\gamma(x)$ and the resin temperature dependency degree "$\log B(x)-\alpha(x)T$". The interdependence coefficient of the resin temperature with respect to the injection velocity and the injection pressure (resin pressure) is obtained according to the equation (14).

In the above-described first embodiment, the injection pressure (resin pressure) Pr(m) and the screw position SP(m) are obtained at every sampling time period and these data are sent to the personal computer. Alternatively, the screw positions or the points in time from the start of injection at which the injection pressure (resin pressure) is detected is set in advance, and the injection pressure (resin pressure) is detected and stored at the set positions or the set points in time so that the combinations (Pr, V, TC) of the N number of injection pressure (resin pressure), the injection velocity and the resin temperature are sent to the personal computer for analyzing the data.

In the foregoing first embodiment, the collection of data and the data analysis are separately carried out by the controller of the injection molding machine and the personal computer connected to the controller, respectively. In the following second and third embodiments, both of the collection of data and the data analysis are carried out by the controller of the injection molding machine.

Figure 10:
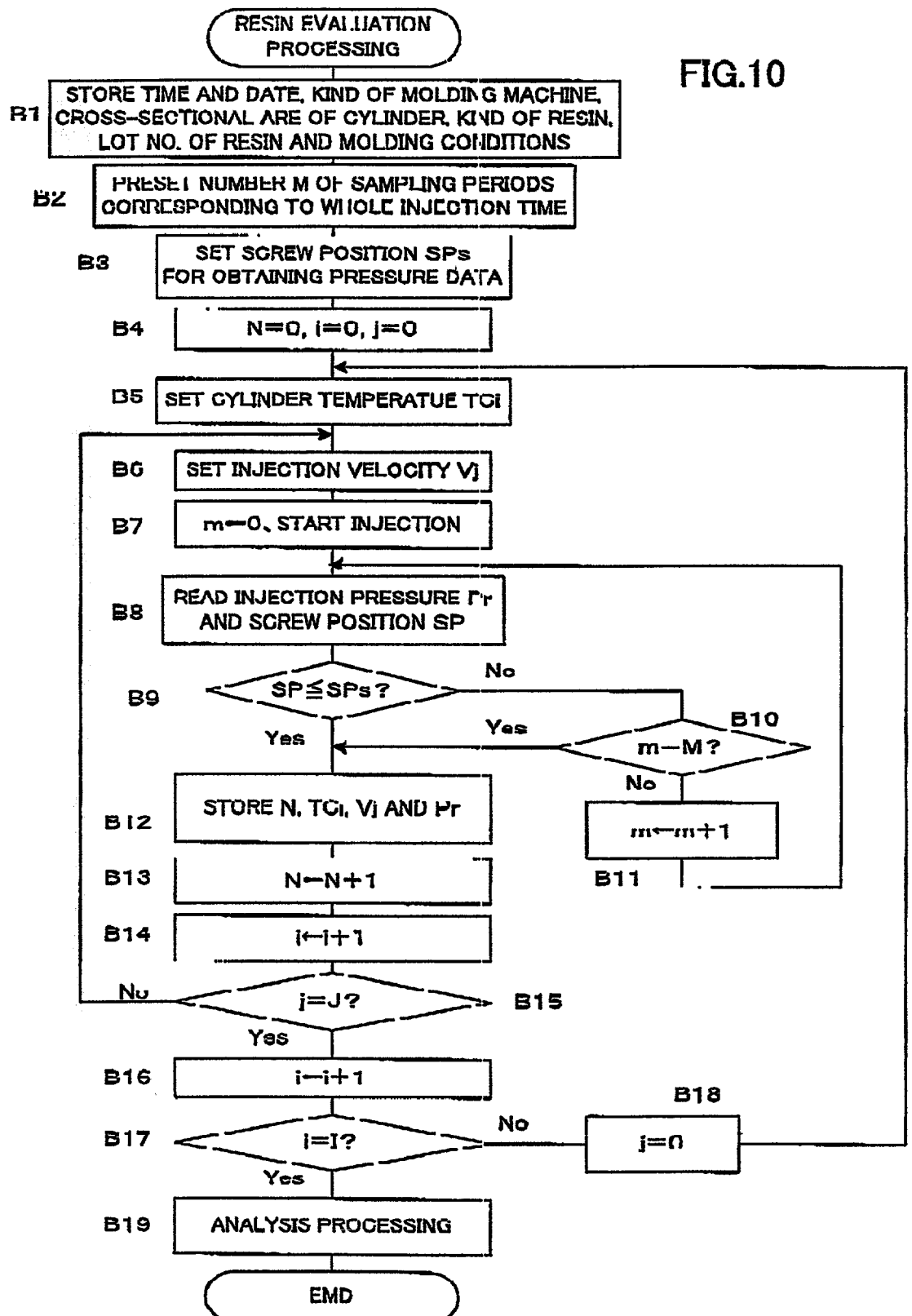
FIG. 10 is a flowchart of processing of data collection and data analysis for the evaluation of resin according to a second embodiment of the present invention.

FIG. 10 shows a flowchart of resin evaluating processing to be performed by the PC CPU 21 in the controller of the injection molding machine according to the second embodiment. The processing of Steps B1, B2 and B4 in this embodiment is equivalent to the processing of Steps A1, A2 and A3 in the first embodiment and thus description thereon is omitted. In this embodiment, Step B3 of setting predetermined screw positions SPs(-Xs) at which the injection pressure (resin pressure) is detected is added. Further, the processing of Steps B5–B7 of setting a value of the set temperature TCi indicated by the index i as the cylinder temperature, waiting until the resin temperature (cylinder temperature) reaches the set temperature, setting a value of the set injection velocity Vj indicated by the index j, setting the counter m to "0" and starting an injection is the same as the processing of Steps A4–A6, and therefore the detailed description is omitted When an injection is started, the injection pressure (resin pressure) Pr and the screw position SP(=x) are read (Step B8 as in Step A7 of the first embodiment) and it is determined whether or not the read screw position SP (=x) is equal to or less than the set position SPs(=Xs) (Step B9). If it is determined that the detected screw position SP is greater than the set position SPs (SP<SPs), it means that the screw does not reach the set screw position SPs since an origin is set to a distal end of the cylinder and a positive direction of an axis of abscissa is set to direct to a proximal end of the cylinder in a coordinate system of the screw position. In this case, it is determined whether or not the value of the counter m reaches the set sampling times M corresponding to the maximum injection time period (Step B10). If the value of the counter m does not reach the set sampling times, the value of the counter m is incrementally increased by "1" (Step B11) and the procedure returns to Step B8. Subsequently, the processing of Steps B8–B11 is repeatedly executed at every sampling period. In Step B10, if it is determined that the counter m reaches the set sampling times M, the procedure proceeds to Step B12.

If it is determined that the read screw position SP is not greater than the set position SPs (Step B9), the present value of the index N, the present resin temperature (cylinder temperature) TCi set in Step B5, the present injection velocity Vj set in Step B6 and the injection pressure (resin pressure) Pr read in Step B8 are stored in the data table Tb-2 provided in the data storage RAM 24, as shown in FIG. 13 (Step B12).

The indexes N and j are incrementally increased by "1" (Step B13, B14) and it is determined whether or not the index j reaches the set value J (Step B15). If the index j has not reached the index J, the procedure returns to Step B6 where the next value of the injection velocity Vj indicated by the index j is set and the processing of Steps B7 and the subsequent Steps is executed. In this manner when the index j reaches the set value J, data with the index N from 0 to J−1, the resin temperature (cylinder temperature) of TC0,the injection velocity from Vo to V(J−1), the detected injection pressure from Pr0 to Pr(J−1) are stored in the table Tb-2.

When it is determined that the index j reaches the set value J, the index i is incrementally increased by "1" (Step B16) and it is determined whether or not the index i has reached the set value I (Step B17). If the index i has not reached the set value I, the index j is set to "0" (Step B18) and the procedure returns to Step B5. The next value of the temperature TCi indicated by the index i is set to as the cylinder temperature and the processing of Step B6 and the subsequent Steps is performed after waiting elapse of time until the resin temperature (cylinder temperature) reaches the set temperature TCi. Then, the processing of Steps B5–B17 is performed until the index i reaches the set value I, and when the index i has reached the set value I, the procedure proceeds from Step B17 to Step B19. In this point in time, the resin temperatures (cylinder temperatures) TC, the injection velocities V and the injection pressures (resin pressure) Pr with the index varying from 0 to (1×J−1) are stored in the data table Tb-2.

An analysis for evaluation of resin is performed based on the data in the data table Tb-2 in Step B19. In the case where the analysis is to be performed using the injection velocity, the simultaneous equations (11)–(13) are solved based on the combinations (Pr, V, TC) of the N number of values of the injection pressure (resin pressure), values of the injection velocity, values of the resin temperature (cylinder temperature), to obtain $\sigma(=\log A(x))$, $\alpha(x)$, $\beta(x)$. Then, the resin characteristic is evaluated using the velocity dependence degree $\beta(x)$ and the resin temperature dependence degree ($\log A(x)-\alpha(x)T$). Also, the interdependent relationship function expressed by the equation (7) representing correlation among the resin temperature, the injection velocity and the injection pressure (resin pressure) is obtained and the obtained velocity dependency degree $\beta(x)$, the resin dependency degree ($\log A(x)-\alpha(x)T$) and the interdependency relation function are displayed on the display device to complete the resin evaluation processing.

In the case where the flow rate of resin is selected for evaluation of resin, the flow rate Q is obtained by multiplying the cross-sectional area of the cylinder by the injection velocity, to obtain the combinations (Pr, Q, TC) of the N number of values of the injection pressure (resin pressure), values of the flow rate, values of the cylinder (resin) temperatures. Then, the simultaneous equations (18)–(20) are solved to obtain $\sigma(-\log B(x))$, $\gamma(x)$, $\alpha(x)$, and the flow rate dependence degree $\gamma(x)$ and the resin temperature dependence degree $(\log B(x)-\alpha(x)T)$, to evaluate the resin characteristics. Also, the interdependency relation function representing correlation among the resin temperature, the injection velocity and the injection pressure (resin pressure) expressed by the equation (14) is obtained and the obtained flow rate dependency degree $\gamma(x)$, the resin temperature dependency degree $(\log B(x)-\alpha(x)T)$ and the interdependency relation function are displayed on the display device to complete the resin evaluation processing.

Figure 14:
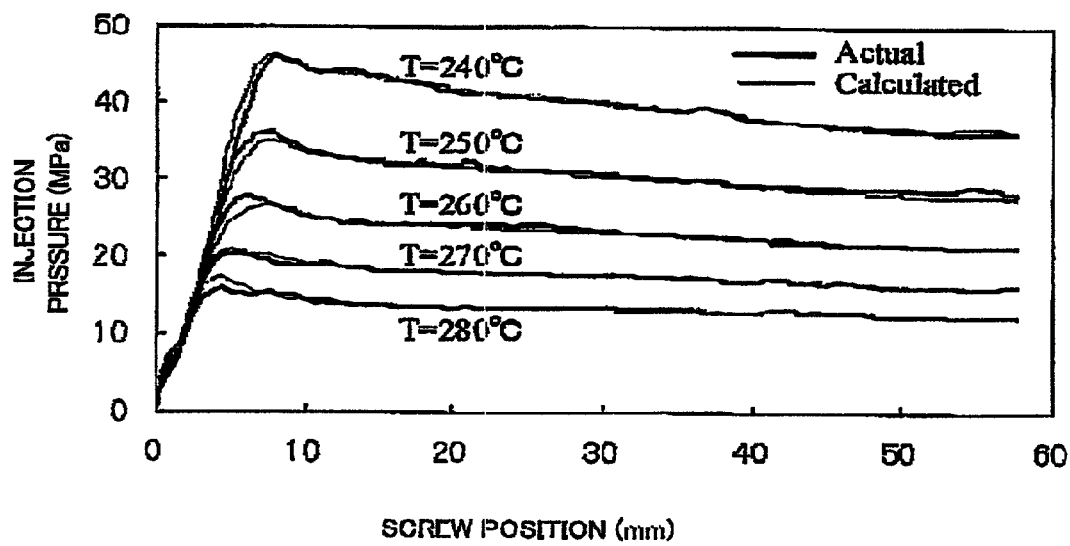
FIG. 14 is a graph showing actually measured values and results of calculation according to the present invention, of the injection pressure with respect to the screw position on conditions of different resin pressures and a constant injection velocity.
Figure 15:
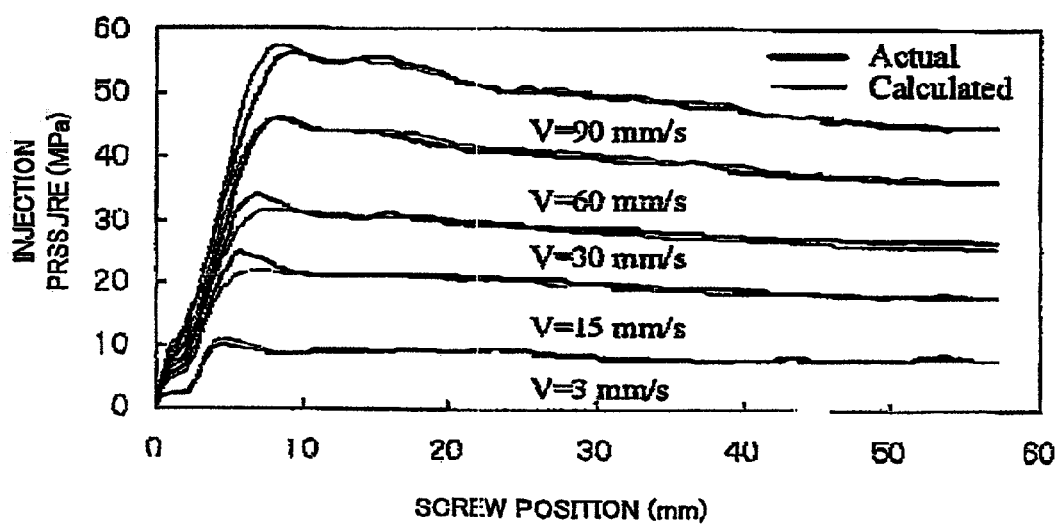
FIG. 15 is a graph showing actually measured values and results of calculation according to the present invention, of the injection pressure with respect to the screw position on conditions of a constant resin pressure and different injection velocities.

FIGS. 14 and 15 show results of calculations according to the equation (7) and the actual measurement values of the injection pressure with respect to the screw position. FIG. 14 shows variation of the injection pressure with respect to the screw position at a constant injection velocity of 60 mm/s under different resin temperatures T. FIG. 15 shows variation of the injection pressure with respect to the screw position at a constant resin temperature of 240° C. and under different of injection velocities V.

As can be seen from FIGS. 14 and 15, the calculated values and the actually measured values substantially coincide with each other. Thus, it is considered that the equation (7) expresses the relationship between the pressure dependence characteristics and the injection velocity and resin temperature dependence characteristics. The resin characteristics can be evaluated based on the velocity dependency degree $\beta(x)$, the resin temperature dependency degree $(\log A(x)-\alpha(x)T)$ of the injection pressure (resin pressure) obtained according to the equation (7).

Figure 16:
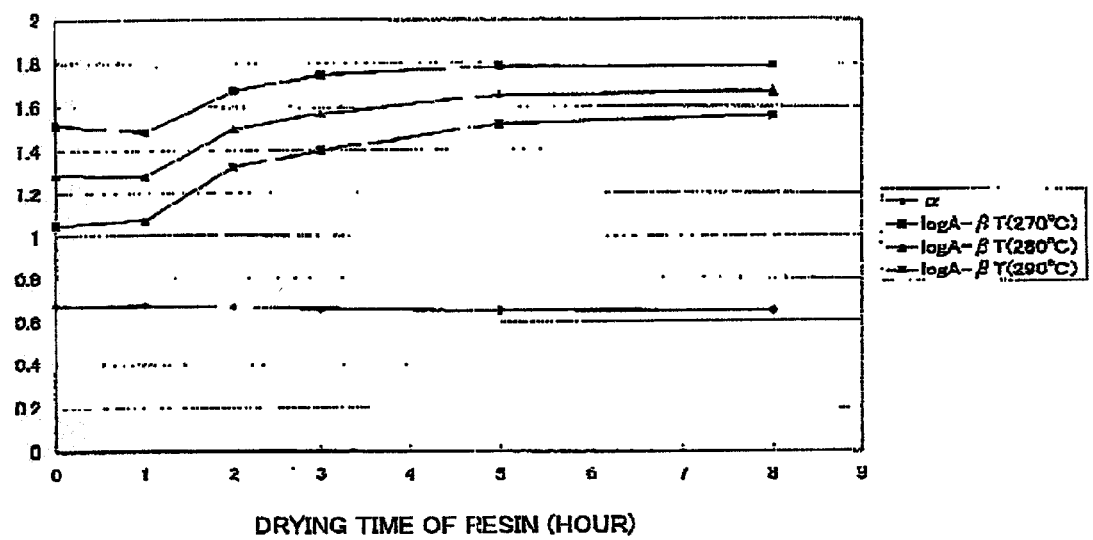
FIG. 16 is a graph showing evaluation values of resin with respect to drying time of resin.

FIG. 16 shows resin evaluation values with respect to drying time of resin. The velocity dependence degree $\beta(x)$ and the resin temperature dependence degree $(\log A(x)-\alpha(x)T)$ are obtained according to the equation (8) as the interdependence relationship function with respect to the drying time of the resin. As shown in FIG. 16, the velocity dependence degree $\beta(x)$ and the resin temperature dependence degree $(\log A(x)-\alpha(x)T)$ varies with variation of the drying time of resin, and the interdependent relationship among the injection pressure (resin pressure) P, the injection velocity v and the resin temperature T changes therewith.

The equation (7) or (14) expressing the interdependent relationship function thus determined may be stored for each kind of resin in the memory, and the interdependency relation may be displayed as a graph based on the interdependency relation function for a designated resin, for the benefit of grasping the resin characteristics and setting optimal molding conditions.

Figure 17:
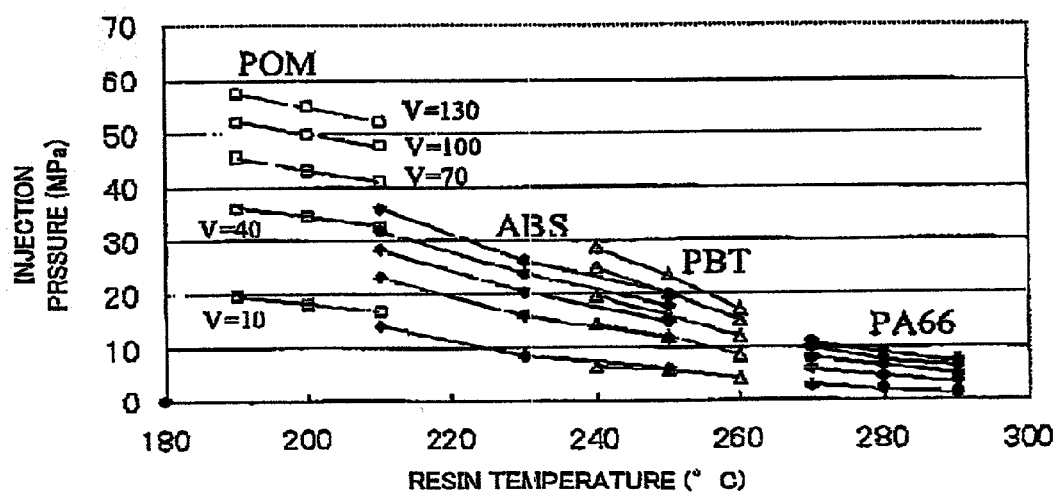
FIG. 17 is an example of a graphical display showing correlation of the resin temperature, the injection velocity and the injection pressure for various kind of resin.

FIG. 17 shows distribution status of the injection pressure for various kinds of resin under different injection velocities with an axis of abscissa representing the resin temperature and an axis of ordinate representing the resin temperature. The injection pressure with respect to the resin temperature is indicated with the kind of resin designated and the resin temperature range and the injection velocity designated. In this example in FIG. 17, characteristics of different kinds of resin "POM"; "ABM","PBM" and "PA66" are shown with different injection velocities "130 mm/s", "100 mm/s", "70 mm/s", "40 mm/s" and "10 mm/s" (the uppermost line indicates "130 mm/s" and the downmost line indicates "10 mm/s)" and different ranges of the resin temperature.

In setting the molding conditions, an operator commands to display a graph showing the relationship between the injection pressure and the resin temperature for the kind of resin to be used, as shown in FIG. 17, on the display device of the manual data input device 29 or the personal computer, and refers to the display of the graph with respect to the other resin to find the characteristics of the injection pressure with respect to the resin temperature similar to the resin to be used. If there is a kind of resin having the similar characteristics, the operator may refer to the molding conditions already set for the resin in setting the molding conditions for the kind of resin to be used.

Further, as shown in FIGS. 14 and 15, an operator may refer to the display of the graphs showing results of arithmetic operation according to the equations (7) or (14) on the injection pressure with respect to the screw position under different resin temperatures and different injection velocities to select the molding conditions to carry out the setting of molding condition easily.

Furthermore, based on the results of the arithmetic operations, the relationship between the injection pressure and the resin temperature may be displayed in a similar manner as shown in FIG. 3, and the relationship between the injection pressure and the injection velocity may be displayed in a similar manner shown in FIG. 4. Thus, the influencing degrees of the resin temperature and the injection velocity on the injection pressure can be recognized visually to contribute to the setting of the molding conditions.

Figure 11:
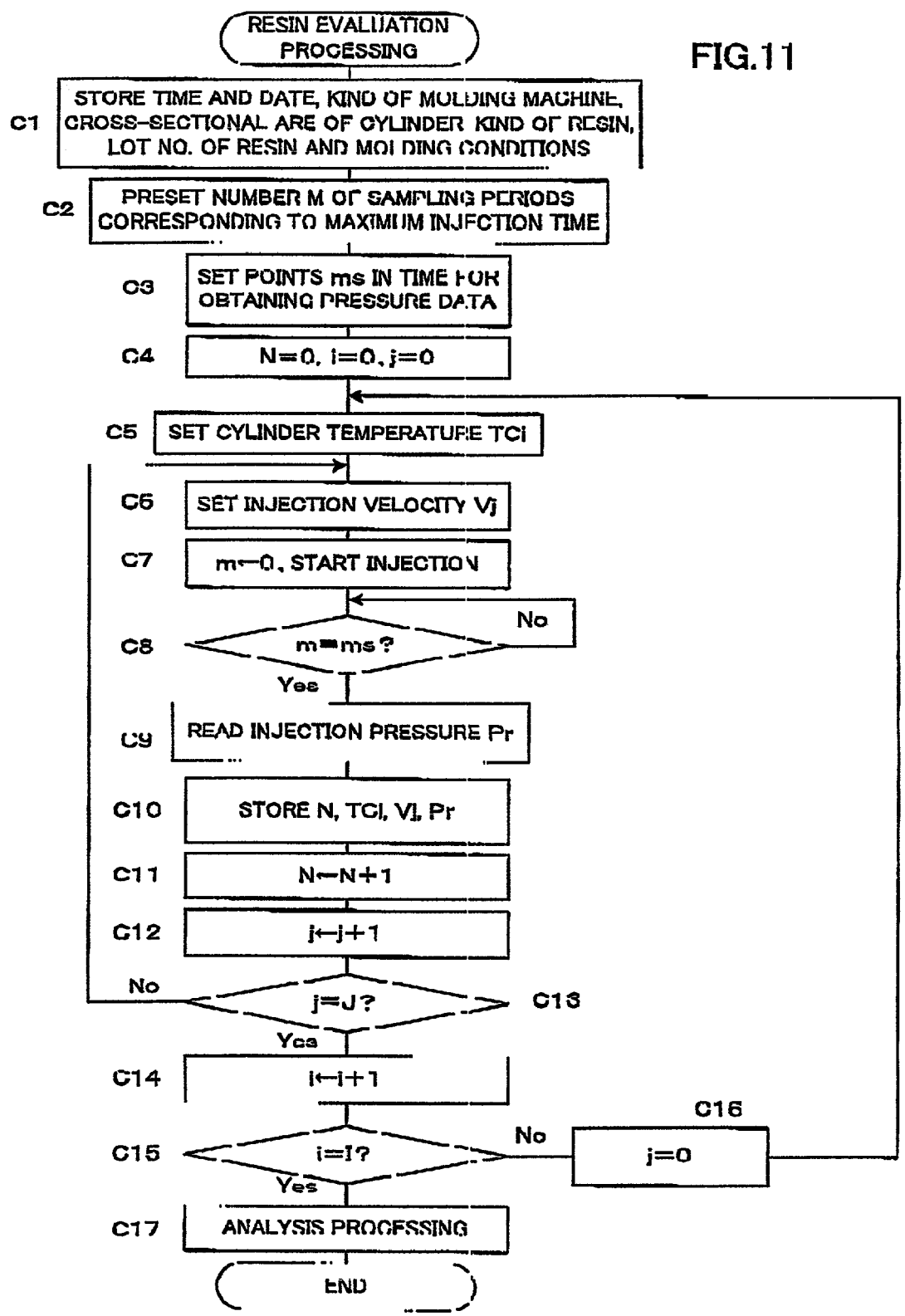
FIG. 11 is a flowchart of processing of data collection and data analysis for the evaluation of resin according to a third embodiment of the present invention.

In the foregoing first and second embodiments, the injection pressure (resin pressure) Pr is obtained with respect to the screw position. Alternatively, the injection pressure may be measured with respect to an elapsing time from a start of injection instead of the screw position and the relationship among the injection pressure, the resin temperature and the injection velocity as expressed by the equations (7) and (14) may be obtained based on the measured injection pressure with respect to the elapsing time Such method will be described referring to FIG. 11 as a third embodiment.

In the third embodiment, the processing of Steps C1–C7 is equivalent to the processing of Steps B1–B7 in the second embodiment but differs in that points ms in time elapsing from a start of injection are set in Step C3 instead of setting the screw positions SPs in Step D3 and that the counter m stores the elapsing time from the start of injection. Therefore, detailed description of the processing in Steps C1–C7 are omitted.

After the resin temperature (cylinder temperature) TCi is set (Step C5) and the injection velocity Vj is set (Step C6),an injection is started (Step C7) and the procedure waits until the counter m measuring the elapsing time from the start of injection reaches the set value ms (Step C8). When the counter reaches the set value ms, the injection pressure (resin pressure) Pr is read (Step C9) and the present value of the index N, the present resin temperature (cylinder temperature) TCi set in Step C5, the present injection velocity Vj set in Step C6 and the injection pressure (resin pressure) Pr read in Step C9 are stored (Step 10). Subsequent processing of Steps C11–C17 is the same as the processing of Steps B13–B19 in the second embodiment.

In particular, the index N and the index j are incrementally increased by "1" respectively and the processing of Steps C6–C13 is repeatedly executed until the index j reaches the set value J When the index j reaches the set value J, the index i is incrementally increased by "1" and the processing of Step C5 and the subsequent Steps is repeatedly executed until the index i reaches the set value 1 after the index j is set to "0". At the time when the index i reaches I, the data table Tb-2 as shown in FIG. 13 is completed. The processing equivalent to that of Step B19 in the second embodiment is performed in Step C17 based on the data table Tb-2, to obtain and display the interdependence relation function, etc. in the same manner as the second embodiment In the foregoing embodiments, the pressure sensor such as a load cell for detecting the pressure applied from the molten resin (injection pressure) to the screw, however, any sensor capable of detecting the resin pressure may be used. For example, a pressure sensor provided at the distal end of the cylinder or the nozzle may be used for detecting the resin pressure for analyzing the resin. Further, the cylinder temperature is adopted as the resin temperature in the foregoing embodiments, however, the nozzle temperature may be adopted as the resin temperature. It is preferable to adopt the detected value well representing the resin temperature.

According to the present invention, resin characteristics are analyzed using an injection molding machine without using a special measuring device dedicated for analyzing the resin characteristics. The evaluation of resin is based on the numerical data obtained in performing injections under the same conditions as that in an actual injection using the injection molding machine. Thus, the data well representing the resin characteristics contributing to the actual molding operation can be obtained in a simple manner, to improve quality of molded products.

What is claimed is:

1. A resin evaluation method using an injection molding machine comprising:
    performing a first predetermined number of air shot injections of molten resin with constant injection velocity and different values of resin temperature automatically altered successively for the respective air shot injections, and with resin pressure and injection screw position, or resin pressure and injection time elapsed from start of the injection as the injection screw is advanced, being measured for the respective air shot injections;
    performing a second predetermined number of air shot injections of molten resin with constant resin temperature and different values of injection velocity automatically altered successively for the respective air shot injections, and with resin pressure and injection screw position, or resin pressure and injection time elapsed from start of the injection as the injection screw is advanced, being measured for the respective air shot injections; and
    evaluating characteristics of the molten resin by automatically obtaining at least one of a degree of resin-temperature dependency of variation of the resin pressure in the air shot injections, and a degree of velocity or flow-rate dependency of variation of the resin pressure in the air shot injections, based on either a relationship between the resin pressure and the screw position or a relationship between the resin pressure and the injection time, measured in the air shot injections.

2. A resin evaluation method using an injection molding machine according to claim 1, wherein the resin pressure is detected by a pressure sensor for detecting resin pressure at a nozzle of the injection molding machine or a pressure sensor for detecting resin pressure applied to the screw.

3. A resin evaluation method using an injection molding machine according to claim 1, wherein the relationship between the resin pressure and the screw position or the injection time elapsed from a start of each injection are expressed by the resin pressure at set screw positions or the resin pressure at set points in time elapsing from a start of each injection.

4. A resin evaluation method using an injection molding machine according to claim 1, wherein the resin temperature is represented by a nozzle temperature or a cylinder temperature.

5. A resin evaluation method using an injection molding machine comprising:
    performing a first predetermined number of air shot injections of molten resin with constant injection velocity and different values of resin temperature automatically altered successively for the respective air shot injections, and with resin pressure and injection screw position, or resin pressure and injection time elapsed from start of the injection as the injection screw is advanced, being measured for the respective air shot injections;
    performing a second predetermined number of air shot injections of molten resin with constant resin temperature and different values of injection velocity automatically altered successively for the respective air shot injections, and with resin pressure and injection screw position, or resin pressure and injection time elapsed from start of the injection as the injection screw is advanced, being measured for the respective air shot injections; and
    evaluating characteristics of the molten resin by automatically obtaining an interdependency relation of variation of the resin pressure in the air shot injections with respect to the resin temperature and an injection velocity or a flow rate of resin, based on either a relationship between the resin pressure and the screw position or a relationship between the resin pressure and the injection time measured in the air shot injections.

6. A resin evaluation method using an injection molding machine according to claim 5, wherein said interdependency relation is obtained according to an equation expressing the resin pressure using a power function of the injection velocity or the flow rate of resin, and an exponential function of the resin temperature.

7. A resin evaluation method using an injection molding machine according to claim 6, wherein a degree of resin temperature dependency of the resin pressure and a degree of velocity or flow rate dependency of the resin pressure are obtained based on said equation.

8. A resin evaluation method using an injection molding machine according to claim 5, wherein the resin pressure is detected by a pressure sensor for detecting resin pressure at a nozzle of the injection molding machine or a pressure sensor for detecting resin pressure applied to the screw.

9. A resin evaluation method using an injection molding machine according to claim 5, wherein the relationship between the resin pressure and the screw position or the relationship between the resin pressure and the injection time elapsed from a start of injection are expressed by the resin pressure at set screw positions or the resin pressure at set points in time elapsing from a start of injection.

10. A resin evaluation method using an injection molding machine according to claim 5, wherein the resin temperature is represented by a nozzle temperature or a cylinder temperature.

11. A resin evaluation method using an injection molding machine comprising:
    performing a predetermined number of air shot injections of molten resin in which a resin temperature is automatically successively altered, and in which an injection velocity is also automatically successively altered in accordance with the successive alterations of the temperature;

detecting an injection pressure in each of the air shot injections;

obtaining data of the injection pressure, the injection velocity and the resin temperature in each of the injections; and evaluating characteristics of the molten resin by automatically obtaining an interdependency relation of variation of the resin pressure in the air shot injections with respect to the resin temperature and the injection velocity or flow rate of resin based on combinations of the data of the injection pressure, the injection velocity and the resin temperature in the injections.

12. A resin evaluation method using an injection molding machine according to claim 11, wherein a screw position and the injection pressure are detected at every predetermined period in each of the air shot injections, and the interdependency relation is automatically obtained as a function of the screw position or an injection time elapsed from a start of each injection.

13. A resin evaluation method using an injection molding machine according to claim 11, wherein the injection pressure is detected at set positions or set points in time elapsing from a start of injection in each of the injections, and the data of the injection pressure, the injection velocity and the resin temperature are obtained in each of the injections.

14. A resin evaluation method using an injection molding machine according to claim 11, wherein said air shot injection comprises an air shot of injecting resin in air without a mold attached to the injection molding machine.

15. A resin evaluation method using an injection molding machine according to claim 11, wherein the injection pressure is detected by a pressure sensor for detecting resin pressure at a nozzle of the injection molding machine or a pressure sensor for detecting resin pressure applied to the screw.

16. A resin evaluation method using an injection molding machine according to claim 11, wherein the resin temperature is represented by a nozzle temperature or a cylinder temperature.

17. A resin evaluation device using an injection molding machine comprising:

one or more nozzles through which a first predetermined number of air shot injections of molten resin are performed with constant injection velocity and different values of resin temperature automatically altered successively for the respective air shot injections, and with resin pressure and injection screw position, or resin pressure and injection time elapsed from start of the injection as the injection screw is advanced, being measured for the respective air shot injections, and through which a second predetermined number of air shot injections of molten resin are performed with constant resin temperature and different values of injection velocity automatically altered successively for the respective air shot injections, and with resin pressure and injection screw position, or resin pressure and injection time elapsed from start of the injection as the screw is advanced, being measured for the respective air shot injections; and analyzer to evaluate characteristics of the molten resin by automatically obtaining at least one of a degree of resin temperature dependency of variation of the resin pressure in the air shot injections and a degree of the injection velocity or flow rate dependency of variation of the resin pressure in the air shot injections based on the detected resin pressure, the injection velocity, and the resin temperature, at one of set screw positions and at set points in time elapsing from a start of injection.

18. A resin evaluation device using an injection molding machine according to claim 17, wherein said analyzer is provided separately from the injection molding machine, and data of screw positions or points in time elapsing from a start of injection, data of resin temperature, data of injection velocity and data of resin pressure obtained in the air shot injections of resin are inputted to said analyzer.

19. A resin evaluation device using an injection molding machine according to claim 17, wherein said analyzer is provided separately from the injection molding machine, and the data of injection velocity, the data of resin temperature, the data of detected values of the resin temperature at set screw positions or at set points in time elapsing from a start of injection are inputted to the analyzer.

20. A resin evaluation device using an injection molding machine according to claim 17, further comprising:

a pressure sensor provided at a nozzle of the injection molding machine or a pressure sensor for detecting resin pressure applied to the screw.

21. A resin evaluation device using an injection molding machine according to claim 17, wherein the resin temperature is represented by a nozzle temperature or a cylinder temperature.

22. A resin evaluation device using an injection molding machine comprising:

one or more nozzles through which a first predetermined number of air shot injections of molten resin are performed with constant injection velocity and different values of resin temperature automatically altered successively for the respective air shot injections, and with resin pressure and injection screw position, or resin pressure and injection time elapsed from start of the injection as the injection screw is advanced, being measured for the respective air shot injections, and through which a second predetermined number of air shot injections of molten resin are performed with constant resin temperature and different values of injection velocity automatically altered successively for the respective air shot injections, and with resin pressure and injection screw position, or resin pressure and injection time elapsed from start of the injection as the screw is advanced, being measured for the respective air shot injections; and an analyzer to evaluate characteristics of the molten resin by automatically obtaining an interdependency relation of variation between the resin pressure in the air shot injections with respect to the resin temperature and an injection velocity or a flow rate of resin based on the detected resin pressure, the injection velocity and the resin temperature at one of set screw positions and at set points in time elapsing from a start of each injection.

23. A resin evaluation device using an injection molding machine according to claim 22, wherein said analyzer is provided separately from the injection molding machine, and data of screw positions or points in time elapsing from a start of injection, data of resin temperature, data of injection velocity and data of resin pressure are inputted to said analyzer.

24. A resin evaluation device using an injection molding machine according to claim 22, wherein said analyzer is provided separately from the injection molding machine, and the data of injection velocity, the data of resin temperature, the data of detected values of the resin temperature at set screw positions or at set points in time elapsing from a start of injection are inputted to the analyzer.

25. A resin evaluation device using an injection molding machine according to claim 22, further comprising:
a pressure sensor provided at a nozzle of the injection molding machine or a pressure sensor for detecting resin pressure applied to the screw.

26. A resin evaluation device using an injection molding machine according to claim 22, wherein the resin temperature is represented by a nozzle temperature or a cylinder temperature.

27. A resin evaluation device using an injection molding machine according to claim 22, wherein said analyzer obtains the interdependency relation according to an equation expressing the resin pressure using a power function of the injection velocity or the flow rate of resin, and an exponential function of the resin pressure.

28. A resin evaluation device using an injection molding machine comprising:
a controller to control the injection molding machine to successively perform a plurality of air shot injections of molten resin at different injection velocities set for each of set different resin temperatures;
a detector to detect a resin pressure in each of the air shot injections;
a storage to store a set of the resin temperature, an injection velocity and a resin pressure in each of the air shot injections;
an analyzer to analyze an interdependency relation of variation of the resin pressure in the air shot injections with respect to the resin temperature and the injection velocity or a flow rate of resin based on data stored in said storage.

29. A resin evaluation device using an injection molding machine according to claim 28, wherein said detector detects an injection pressure and a screw position at every predetermined time period in each of the injections, said storage stores the screw position, and said analyzer obtains the interdependency relation as a function of the screw position.

30. A resin evaluation device using an injection molding machine according to claim 29, further comprising a display to display at least one of the relationship between the injection pressure and the injection velocity or the flow rate of resin, and the relationship between the injection pressure and the resin pressure as a function of the screw position based on the obtained interdependency relation.

31. A resin evaluation device using an injection molding machine according to claim 28, wherein said detector detects the injection pressure at set screw positions or set points in time elapsing form a start of each injection.

32. A resin evaluation device using an injection molding machine according to claim 28, further comprising a display to display at least one of the relationship between the injection pressure and the injection velocity or the flow rate of resin, and the relationship between the injection pressure and the resin temperature based on the obtained interdependency relation.

33. An apparatus for evaluating resin using an injection molding machine according to claim 28, further comprising an interdependency storage to store the interdependency relation of the resin pressure with respect to the resin temperature and the injection velocity or the flow rate of resin for each kind of resin, and a display to display a graph based on the stored interdependency relation for a designated kind of resin.

34. A resin evaluation device using an injection molding machine according to claim 28, wherein said detector includes a pressure sensor provided at a nozzle of the injection molding machine or a pressure sensor for detecting resin pressure applied to the screw.

35. A resin evaluation device using an injection molding machine according to claim 28, wherein the resin temperature is represented by a nozzle temperature or a cylinder temperature.

36. A resin evaluation device using an injection molding machine according to claim 28, wherein said analyzer obtains the interdependency relation according to an equation expressing the resin pressure using a power function of the injection velocity or the flow rate of resign, and an exponential function of the resin pressure.

* * * * *

UNITED STATES PATENT AND TRADEMARK OFFICE
CERTIFICATE OF CORRECTION

PATENT NO.        : 7,144,531 B2
APPLICATION NO.   : 10/091385
DATED             : December 5, 2006
INVENTOR(S)       : Masao Kamiguchi et al.

It is certified that error appears in the above-identified patent and that said Letters Patent is hereby corrected as shown below:

Column 1, Line 18, change "obtaining" to --obtain--.
Column 1, Line 18, change "product" to --products--.
Column 1, Line 23, change "deviation)." to --deviation.--.
Column 1, Line 28, after "obtained" insert --in--.
Column 1, Line 35, after "this" insert --is--.
Column 1, Line 51, change "machines" to --machine--.
Column 2. Line 31, after "injections" change "," to --;--.
Column 3, Line 20, after "at" delete "i".
Column 3, Line 28, after "relationship" change "a" to --as--.
Column 3, Line 37, after "constituting" delete ",".
Column 4, Line 25, change "A5-50 mm" to --A5=50 mm--.
Column 4, Line 25, change "A6-57.5 mm" to --A6=57.5 mm--.
Column 4, Line 34, change "$P(T,x)=c(x)e^{-a(x)T}$" to --$P(T,x)=c(x)e^{-a(x)T}$--.
Column 4, Line 46, change "$P(v(x),x)=d(x)v(x)^{\beta(x)})$" to --$P(v(x),x)=d(x)v(x)^{\beta(x)}$--.
Column 4, Line 54, change "temperature" to --temperatures--.
Column 5, Line 14, "$P_{VT}(T,v(x),x)=P(T,x)xP(v(x),x)$" to --$P_{VT}(T,v(x),x)=P(T,x)xP(v(x),x)$--.
Column 5, Line 35, after "dependency" change "an" to --on--.
Column 5, Line 41, change "$\sigma$-log A(x)" to --$\sigma$=log A(x)--.
Column 6, Line 39, change "$P_{QT}(T, Q(x),x)=B(x)Q(x)^{7}(x)e^{-n(x)T}$" to --$P_{QT}(T,Q(x),x)=B(x)^{7(x)}e^{-n(x)T}$--.
Column 6, Line 59, change "$\pi=0-y(x)w-a(x)T$" to --$\pi=\sigma-y(x)w-a(x)T$--.
Column 6, Line 67, after "Qi" insert --,--.
Column 7, Line 42, change "arm" to --are--.
Column 8, Line 27, change "provide" to --provided--.
Column 8, Line 41, change "like" and to --the--.
Column 8, Line 43, "illustrated" to --distributed--.
Column 8, Line 63, "condition:" to --conditions--.
Column 9, Line 16, change "nozzle,)" to --nozzle)--.
Column 9, Line 24, change "defected" to --detected--.
Column 9, Line 35, after "counter" change "in" to --m--.
Column 9, Line 35, after "M" delete".".
Column 9, Line 48, change "(resin pressures PI(0)-Pr(M)," to --(resin pressures) Pr(0)-Pr(M),--.
Column 9, Line 51, after " "1"" delete ",".
Column 10, Line 51, after "and" change "all" to --an--.
Column 10, Line 52, after "counter" change "in" to --m--.
Column 11, Line 24, after "(resin pressure)" insert --Pr--.
Column 11, Line 60, change "(SP<SPs)," to --(SP>SPs),--.

UNITED STATES PATENT AND TRADEMARK OFFICE
CERTIFICATE OF CORRECTION

PATENT NO. : 7,144,531 B2
APPLICATION NO. : 10/091385
DATED : December 5, 2006
INVENTOR(S) : Masao Kamiguchi et al.

It is certified that error appears in the above-identified patent and that said Letters Patent is hereby corrected as shown below:

Column 14, Line 54, change "(Step 10)." to --(Step C10).--.
Column 20, Line 8, change "form" to --from--.
Column 20, Line 37, change "resign," to --resin,--.

Signed and Sealed this

Third Day of April, 2007

JON W. DUDAS
*Director of the United States Patent and Trademark Office*